US010762185B2

(12) United States Patent
Frost et al.

(10) Patent No.: US 10,762,185 B2
(45) Date of Patent: Sep. 1, 2020

(54) INTERNET OF THINGS (IOT) BASED PROXIMITY VERIFICATION FOR UNAUTHORIZED TRANSACTION PREVENTION

(71) Applicant: INTERNATIONAL BUSINESS MACHINES CORPORATION, Armonk, NY (US)

(72) Inventors: Keith G. Frost, Delaware, OH (US); Kyle M. Brake, Dublin, OH (US); Stanley J. Vernier, Grove City, OH (US); Stephen A. Boxwell, Franklin, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 115 days.

(21) Appl. No.: 16/181,115

(22) Filed: Nov. 5, 2018

(65) Prior Publication Data
US 2020/0143022 A1 May 7, 2020

(51) Int. Cl.
*G06F 21/00* (2013.01)
*G06F 21/32* (2013.01)
*H04L 29/06* (2006.01)
*G06F 21/34* (2013.01)
*G06F 21/40* (2013.01)

(52) U.S. Cl.
CPC .............. *G06F 21/32* (2013.01); *G06F 21/34* (2013.01); *G06F 21/40* (2013.01); *H04L 63/083* (2013.01); *H04L 63/0869* (2013.01); *H04L 63/0884* (2013.01); *G06F 2221/2111* (2013.01)

(58) Field of Classification Search
None
See application file for complete search history.

(56) References Cited

U.S. PATENT DOCUMENTS

| 7,487,170 | B2 | 2/2009 | Stevens | |
|---|---|---|---|---|
| 10,142,794 | B1* | 11/2018 | Diamanti | .............. H04W 12/08 |
| 10,178,508 | B1 | 1/2019 | Diamanti et al. | |
| 2011/0047075 | A1 | 2/2011 | Fourez | |

(Continued)

FOREIGN PATENT DOCUMENTS

| CN | 104952164 A | 9/2015 |
|---|---|---|
| CN | 107093074 A | 8/2017 |

*Primary Examiner* — Andrew J Steinle
(74) *Attorney, Agent, or Firm* — Feb R. Cabrasawan; Amy J. Pattillo

(57) ABSTRACT

In response to receiving a second verification record of a second location and time at which a user is verified as present by a second internet of things (IoT) device based on biometric input recognition, a proximity service maintains the second verification record in association with a user identifier only if travel between the second location and a first location previously recorded at a first time prior to the second time is feasible as determined by a mapping service. In response to receiving a verification request for verifying feasibility of the proximity of an authorized user of an account identifier at a third location at which the account identifier is presented with a transaction request and detecting the second verification record is maintained, the proximity service verifies the feasibility of the proximity of the authorized user as present at the third location in view of the second location and time.

20 Claims, 11 Drawing Sheets

(56) References Cited

U.S. PATENT DOCUMENTS

| | | |
|---|---|---|
| 2015/0032621 A1 | 1/2015 | Kar et al. |
| 2016/0295364 A1 | 10/2016 | Zakaria |
| 2016/0381560 A1 | 12/2016 | Margaliot |
| 2017/0076306 A1* | 3/2017 | Snider .................. G06Q 20/325 |
| 2017/0171178 A1* | 6/2017 | Reynders ............. G06Q 20/145 |
| 2017/0289183 A1 | 10/2017 | Tiernan et al. |
| 2020/0117690 A1* | 4/2020 | Tran .................. G06F 16/90332 |

* cited by examiner

INTERNET OF THINGS (IOT) BASED PROXIMITY VERIFICATION FOR UNAUTHORIZED TRANSACTION PREVENTION

BACKGROUND

1. Technical Field

This invention relates in general to computing systems and more particularly to internet of things (IoT) based proximity verification for unauthorized transaction prevention.

2. Description of the Related Art

Unauthorized individuals presenting account identifiers, such as credit card information, at physical point of service systems with a transaction request, without authorization to use the account identifier for the transaction, is a frequent issue.

BRIEF SUMMARY

In one embodiment, a method is directed to responsive to receiving a second verification record of a second location and a second time at which a user is verified as present at the second location by a second internet of things (IoT) device based on biometric input recognition performed by a second IoT service to the second IoT device, maintaining, by a computer system, the second verification record in a user location database in association with a user identifier for the user only if travel between the second location and a first location previously recorded at a first time prior to the second time is feasible as determined by a mapping service, the second IoT device for performing another service using a biometric input separate from generating and transmitting the verification record based on the biometric input. The method is directed to, responsive to receiving a verification request for verifying feasibility of the proximity of an authorized user of an account identifier at a third location of a point of service at which the account identifier is presented at a third time with a transaction request and detecting the second verification record is maintained, verifying, by the computer system, the feasibility of the proximity of the authorized user as present at the third location in view of the second location and second time reported by the second IoT device in the second verification record.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to, responsive to receiving a second verification record of a second location and a second time at which a user is verified as present at the second location by a second internet of things (IoT) device based on biometric input recognition performed by a second IoT service to the second IoT device, maintain the second verification record in a user location database in association with a user identifier for the user only if travel between the second location and a first location previously recorded at a first time prior to the second time is feasible as determined by a mapping service, the second IoT device for performing another service using a biometric input separate from generating and transmitting the verification record based on the biometric input. The stored program instructions comprise program instructions to, responsive to receiving a verification request for verifying feasibility of the proximity of an authorized user of an account identifier at a third location of a point of service at which the account identifier is presented at a third time with a transaction request and detecting the second verification record is maintained, verify the feasibility of the proximity of the authorized user as present at the third location in view of the second location and second time reported by the second IoT device in the second verification record.

In another embodiment, a computer program product comprises a computer readable storage medium having program instructions embodied therewith, wherein the computer readable storage medium is not a transitory signal per se. The program instructions executable by a computer to cause the computer to, responsive to receiving a second verification record of a second location and a second time at which a user is verified as present at the second location by a second internet of things (IoT) device based on biometric input recognition performed by a second IoT service to the second IoT device, maintain, by a computer, the second verification record in a user location database in association with a user identifier for the user only if travel between the second location and a first location previously recorded at a first time prior to the second time is feasible as determined by a mapping service, the second IoT device for performing another service using a biometric input separate from generating and transmitting the verification record based on the biometric input. The program instructions executable by a computer to cause the computer to, responsive to receiving a verification request for verifying feasibility of the proximity of an authorized user of an account identifier at a third location of a point of service at which the account identifier is presented at a third time with a transaction request and detecting the second verification record is maintained, verify, by the computer, the feasibility of the proximity of the authorized user as present at the third location in view of the second location and second time reported by the second IoT device in the second verification record.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
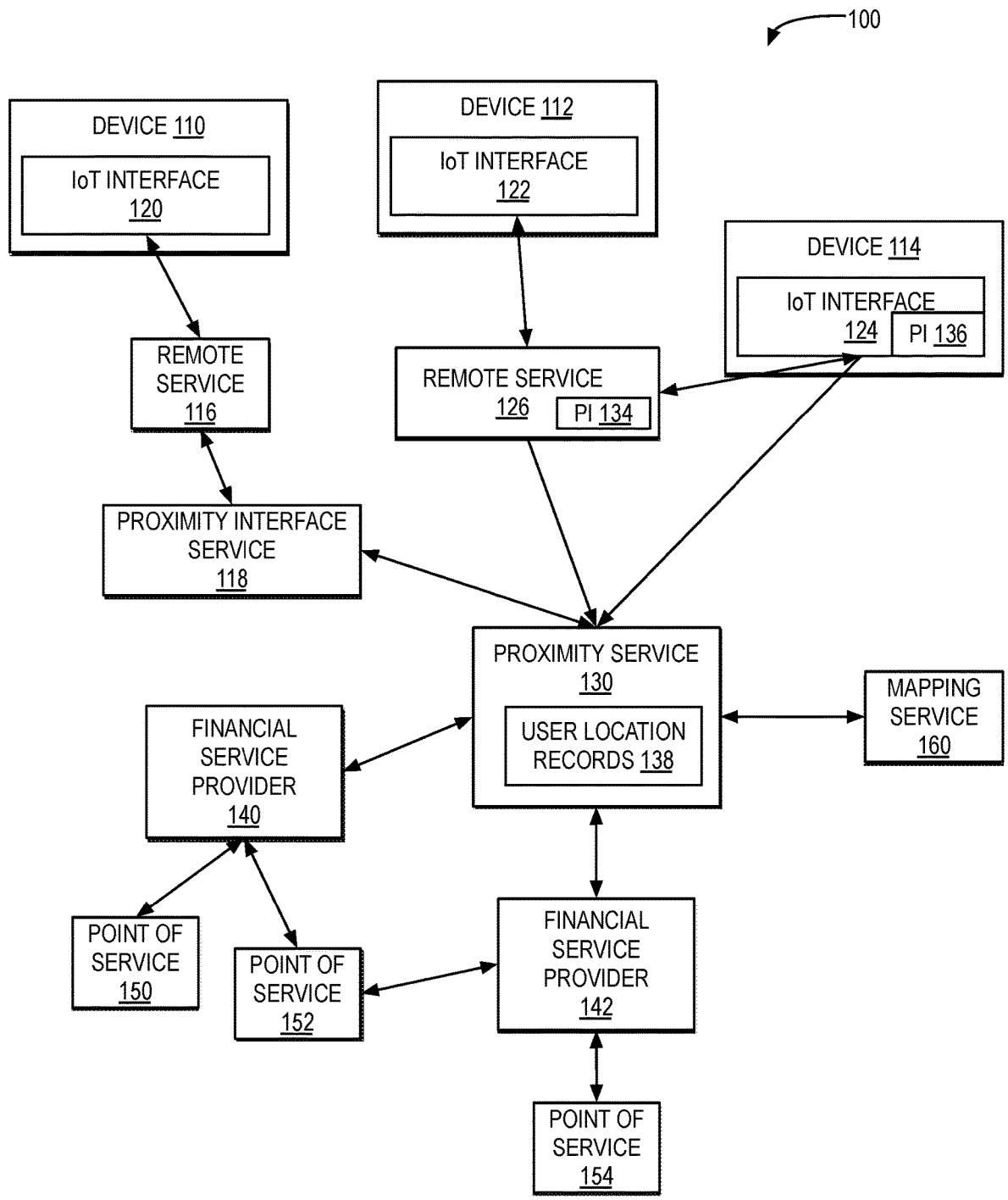
FIG. 1 is a block diagram illustrating one example of an IoT device based proximity verification system for unauthorized transaction prevention.

FIG. 1 illustrates a block diagram of one example of an IoT device based proximity verification system for unauthorized transaction prevention.

As technology continues to advance to enable users to quickly request financial and other types of automated transactions at many different point of service locations by presenting an account identifier, the need for preventing unauthorized transactions to an account identified by the account identifier also increases. For example, in FIG. 1, a point of service 150, point of service 152, and point of service 154 each represent a device interface through which a transaction is completed at a physical place. In one example, point of service 150, point of service 152, and point of service 154 may each represent one or more types of point of service systems including, but not limited to, a point of sale system, a point of purchase system, an automated teller machine, and other systems that provide an interface for user financial and non-financial transactions.

In one example, each point of service connects to one or more financial service providers, where the financial service providers handle financial transactions from and between financial institutions as requested by the financial transaction. For example, a financial service provider may represent a credit card service provider that receives transaction requests for accounts handled by multiple different financial institutions and the credit card service provider manages coordination between financial parties to a requested transaction. For example, transactions through point of service 150 and point of service 152 are supported by a financial service provider 140 and transactions through point of service 152 and points of service 154 are supported by a financial service provider 142.

In one example, at a point of service, a user may present an account identifier, such as a physical or digital credit or debit card or an account token. An unauthorized transaction may occur when a person who is not an authorized user of an account identifier presents that account identifier at a point of service to initiate a transaction. While a point of service system may require one or more additional forms of user identification to authenticate that the user is authorized to use the account identifier for a transaction, many types of inputs required for authenticating a user identification can also be misappropriated and replicated by an unauthorized user at a point of service. For example, it is common for point of service devices to require that a user enter a signature or a pin number as an additional form of authentication, however a person who is not authorized to use an account identifier may also replicate a user signature or pin number and complete the authentication process.

In one example, while some point of service systems may require forms of user identification for authentication that are less easily misappropriated, such as through a biometric entry, not all point of service systems are equipped to require biometric data entry. In addition, not all users may want to provide biometric data to a third party point of service system.

In one example, to reduce unauthorized transactions initiated at point of service systems by unauthorized users, in addition to or independent of requiring a user to enter additional inputs for authentication at a point of service, financial service providers may use proximity verification for assessing the likelihood that a person presenting an account identifier at a point of service is an authorized user of the account identifier. In one example, a proximity service 130 may provide a proximity verification service to multiple disparate financial service providers, such as financial service provider 140 and financial service provider 142, independent of any particular financial service provider. For example, proximity service 130 may provide a separate subscription based service to each financial service provider and may specify a quality of service requirement separately for each financial service provider. In the embodiment, by decoupling proximity service 130 from any particular financial service provider, proximity service 130 is enabled to provide verification services across multiple financial service providers, which facilitates proximity service 130 tracking unauthorized attempts to use a particular account identifier across multiple points of service, independent of any particular financial service provider. In another embodiment, a particular financial service provider may specify proximity service 130 for use by the particular financial service provider only.

In one example, point of service 150 and point of service 152 send an account identifier provided for a transaction and a location of each point of service to financial service provider 140. Financial service provider 140 identifies an account user identifier associated with the account identifier and sends a verification request with the account user identifier, location of the point of service, and level of verification to proximity service 130. Similarly, point of service 152 and point of service 154 send an account identifier provided for a transaction and a location of each point of service to financial service provider 142. Financial service provider 142 identifies an account user identifier associated with the account identifier and sends a verification request with the account user identifier, location of the point of service, and level of verification to proximity service 130.

Proximity service 130 provides proximity verification through one or more types of validated location records received by proximity service 130 indicating previous locations of a user. In one example, IoT devices are configured directly or through IoT related services to verify the presence of a user at a location and time and provide the location, time and presence verification of the user to proximity service 130.

For example, device 110, device 112, and device 114 represent IoT devices by incorporating an IoT interface that enables accessibility as an IoT device to a network. For example, device 110 includes an IoT interface 120, device 112 includes an IoT interface 122, and device 114 includes an IoT interface 124. In one example, an IoT refers to the use of network-connected devices, embedded in the physical environment. In one example, an IoT environment may be more complex than other network based technology applications, including cloud-based applications on top of which an IoT may run, in part, because IoT may include diverse hardware, diverse operating systems and software on devices, and different network gateway requirements.

In one example, the types of IoT devices illustrated by device 110, device 112, and device 114 include, but are not limited to, one or more computing devices, one or more vehicles, one or more home appliances, and one or more other types of items that a user may interact with in a physical environment. In one example, the one or more types of IoT interfaces include, but are not limited to electronics, software, sensors, actuator, and connectivity which enables the one or more devices to connect and exchange data. In one example, device 110, device 112, and device 114 each includes hardware and software that directly interacts with the world and connect to a network to communicate with each other and to remote services. Each of device 110, device 112, and device 114 may provide or consume one or more various types of information.

Each of device 110, device 112, and device 114 may include a location controller that detects a location of each device. In one example, a location controller may represent a global positioning system (GPS) device. In another example, a location controller may represent a controller for determining a location based on triangulation of network cellular signals or other network connections. In another example, a location controller may receive a location from an external service. In additional or alternate embodiments, additional or alternate types of controllers may be integrated in each device for performing location determination services.

In one embodiment, IoT interfaces in devices within network 100, such as IoT interface 120, IoT interface 122, and IoT interface 124, may each implement sensing and actuating capability that includes performance of one or more sensing jobs, one or more actuator jobs, or a combination of sensing and actuating jobs. In one example, sensing capabilities may represent a combination of sensors embedded with or accessible to the IoT interface to monitor the state or surrounding environment and hardware or software that filters the monitored state information. In one example, actuator capabilities may represent output interfaces that reach out and act on the world. In one example, sensors include voice activated sensors that monitor sounds within an environment surrounding the device and determine whether the monitored sounds match words or other sounds for triggering voice activated control. For example, Amazon's Alexa (AMAZON and ALEXA are Registered Trademarks of Amazon.com Inc.), Google's Home (GOOGLE HOME is a Registered Trademark of Google LLC), and Apple's Siri (APPLE and SIRI are Registered Trademarks of Apple Inc.) are examples of devices that include sensors for enabling voice activated services. In one example, a sensor may first filter sounds in an environment to detect a particular trigger sound or word, and upon hearing that particular trigger sound or word, then activate a recording sensor to detect the audio following the trigger sound or word, where the audio following the trigger sound or word may include an instruction or request for service.

In one embodiment, IoT interfaces in devices within network 100, such as IoT interface 120, IoT interface 122, and IoT interface 124, may each implement a tasking capability. In one example, the tasking capability may allow another device embedded with an IoT interface, or a user, to remotely control the device through the Internet.

In one embodiment, both the sensing and actuating capability and the tasking capability of devices embedded with IoT interfaces within network 100 may also rely on remote web services for performing one or more tasks of the jobs performed for the sensing and actuating capability and tasking capability. In one example, remote service 116 and remote service 126 each perform one or more tasks including, but not limited to, transforming data, aggregating data and computing, enriching data, and moving data. In one example, transforming data includes converting data into another format, such as, but not limited to, converting a captured device signal voltage to a calibrated unit measure of temperature, converting voice signals into text, converting text data into voice signals, and performing biometric input recognition, such as comparing a voice signal with a voice sample for voice recognition or comparing a video signal with a video sample for facial recognition. In one example, aggregating data and computing includes, but is not limited to, combining data received from multiple devices and checking the data against thresholds or combining redundant data received from multiple devices to ensure that actionable data is available if one or more devices go offline. In one example, enriching data includes, but is not limited to, combining data generated by a device with other metadata or other data sets, such as weather data or traffic data, for subsequent uses and applications. In one example, moving data includes, but is not limited to, storing processed data in one or more selected storage locations.

In one example, remote service 116 and remote service 126 represent one or more types of services for performing a task of processing audio captured by device 110, device 112, or device 114 by transforming the audio into text, determining whether the text triggers a task for directing a device, and if the text triggers a task for directing a device, determining the instruction for the task and sending the task back to the IoT interface to finish the job with the selected task. For example, if IIoT interface 120 includes sensing functionality for voice activated control, remote service 116 may perform a job of processing audio streamed by IoT interface 120 as likely including the phrase "turn on the lights", select a task for turning on lights and output instructions to one or more devices with embedded IoT interfaces to perform a task of turning on a light. In another example, remote service 116 and remote service 126 may maintain a repository of audio samples associated with a particular user for use in performing voice recognition from captured voice samples or each of the remote services may access a separate repository with voice samples for performing voice recognition. In one example, remote service 116 and remote service 126 may charge a user or another service a subscription fee for performing voice control and voice recognition services.

In one example, remote service 116 and remote service 126 represent one or more types of services for performing a task of processing video captured by device 110, device 112, or device 114 for performing facial recognition on the captured video. In one example, remote service 116 and remote service 126 may maintain a repository of face samples associated with a particular user for use in performing facial recognition or each of the remote services may access a separate repository with face samples. In one example, remote service 116 and remote service 126 may charge a user or another service a subscription fee for performing video analysis and facial recognition.

In the example, IoT interface 124 is configured with a proximity interface (PI) 136, which in response to an event occurring that allows IoT interface 124 to verify the presence of a particular user at a particular location and time proximate to device 114, verifies the user's presence, such as through biometric input recognition, and transmits a verification record with a location, time, and presence verification for the user identifier to proximity service 130. In one example, biometric input recognition represents recognition of a user performed based on one or more types of biometric inputs including, but not limited to, voice inputs used for voice recognition and video input used for facial recognition. In one example, a user may select to configure PI 136 of IoT interface 124 for directly reporting location, date, and presence verification to proximity service 130 or PI 136 may be pre-configured in IoT interface 124 to automatically locate and transmit to proximity service 130. In the example, PI 136 may establish a secure connection for transmitting a verification record with location, time, presence verification, and user identifier to proximity service 130.

In the example, IoT interface 122 is configured to interface with remote service 126 and remote service 126 is configured with a PI 134, which in response to an event occurring that allows remote service to verify the presence of a particular user at a particular location and time proximate to device 112, verifies the user's presence, such as through voice or facial recognition, and transmits a verification record with location, date, presence verification, and user identifier to proximity service 130. In one example, a user may authorize PI 134 of remote service 126 to report a verification record with location, date, presence verification, and user identifier to proximity service 130 or remote service 126 may be configured with PI 134 to automatically locate and transmit a verification record to proximity service 130. In one example, remote service 126 may receive a location from IoT interface 122 with a request to provide a service independent of proximity verification, but which enables PI 134 to send a verification record with a location, time, presence verification, and user identifier to proximity service 130. For example, remote service 126 may receive a location from IoT interface 122 with a voice request to return a weather forecast for the location, convert the voice request to text, access the weather forecast for the location, and return the weather forecast information to IoT interface 122, while PI 134 requests that the service also perform voice recognition on the text to verify the presence of the speaking user and then sends a verification record with a location, time, presence verification, and user identifier to proximity service 130, In the example, IoT interface 120 is configured to interface with remote service 116 and remote service 116 is configured to interface with a proximity interface service 118, which functions as a stand-alone proximity interface, to perform presence verification for a location and time based on data received by remote service 116 from IoT interface 120. In the example, remote service 116, upon detecting location information from IoT interface 120, may trigger proximity interface service 118 to analyze any additional data available from IoT interface 120 and assess presence verification for a particular user. In addition, proximity interface service 118 may be configured to transmit a verification record with a location, time, presence verification, and user identifier to proximity service 130. In addition, proximity interface service 118, as a stand-alone service, may be called by other remote services or directly by one or more IoT interfaces.

In one example, as proximity service 130 receives verification records with location, time, presence verification, and user identifier from one or more of IoT based proximity verification interfaces, illustrated as proximity interface service 118, PI 134, and PI 136, proximity service 130 stores a record of each transmission in association with a user identifier identified in the presence verification data in user location record 138.

In one example, for each new location received in a new verification record by proximity service 130 for a particular user identifier, proximity service 130 triggers a mapping service 160 to determine whether the verification record is valid. In one example, mapping service 160 determines the validity of a verification record by determining the likelihood that a user traveled a previously recorded valid location in user location records 138 to the newly reported location during a time difference from the previously recorded time to the newly reported time. In the example, if mapping service 160 determines that it is realistic within a particular threshold of time for the user to have traveled from the first location to the second location during the time difference given the geography and travel routes available, then mapping service 160 reports to proximity service that the new verification record with location and time for the user identifier is validated and proximity service 130 marks the new verification record as valid in user location records 138. In the example, if mapping service 160 determines that it is not realistic for the user to have traveled from the first location to the second location during the time difference given the geography and travel routes available, then mapping service 160 reports to proximity service 130 that the new location received in the new verification record for the user identifier is not valid and proximity service 130 may discard the new verification record from user location records 138 or mark the new verification record as invalid.

In the example, as proximity service 130 receives verification requests from financial service provider 140 and financial service provider 142, proximity service 130 also triggers mapping service 160 to determine the likelihood that a user traveled from a previously recorded valid location in user location records 138 to the newly reported location of a point of service during a time difference from the previously recorded time to the newly reported time. In the example, if mapping service 160 determines that it is realistic for the user to have traveled from the first location to the second location of the point of service during the time difference given the geography and travel routes available, then mapping service 160 reports to proximity service that the new location for the user identifier in the verification request is validated, proximity service 130 returns a success verification to the requesting financial service provider, and the requesting financial service provider allows a transaction to continue at the requesting point of service. In the example, if mapping service 160 determines that it is not realistic for the user to have traveled from the first location to the second location during the time difference given the geography and travel routes available, then mapping service 160 reports to proximity service that the new location for the user in the verification request is not validated, proximity service 130 returns an failure response to the requesting financial service provider, and the requesting financial service provider declines the transaction to the requesting point of service.

In the example, if proximity service 130 receives a verification request from a financial service provider for a particular account user identifier, proximity service 130 determines whether there are one or more records in user location records 138 for the user identifier that are sufficient for the transaction type. In one example, different transaction types may trigger different time threshold windows and different levels of verification. For example, if a transaction type exceeds a user's spending threshold for the account user identifier, then the type of transaction may require that a previous location time stamp within thirty minutes of the current verification request time and may require the previous location in a record with facial recognition based presence verification from an IoT device. In another example, if a transaction type is less than a user's minimum threshold, then the type of transaction may only require a previous location time stamp within 24 hours of the current verification request time and may only require the previous location in a record of any type from an IoT device.

In the example, if proximity service 130 does not identify any records for the account user identifier in user location records 138 that are sufficient for the transaction type, proximity service 130 may broadcast a request for presence verification of a particular user to one or more proximity interfaces and may include sample content for the user, such as voice or video samples. For example, proximity interface service 118, PI 134, and PI 136 may be configured to listen for broadcasts from other PIs and from proximity service 130. Each proximity interface receiving a verification request broadcast from proximity service 130 may determine whether there are any IoT services available that are enabled to verify the presence of an individual within the environment captured proximate to the IoT device. If proximity interface determines there are any IoT services available that are enabled to verify the presence of an individual within the environment captured proximate to the IoT device, the proximity interfaces triggers the IoT service to analyze content captured in an environment in which an associated IoT device is currently located, determine whether a particular user is present in the content through one or more of voice recognition and facial recognition by the IoT service, such as remote service 116, remote service 126 or an IoT service running on an IoT device, and if there is a match to the sample content through voice recognition or facial recognition, return a verification response with a location and time of the recording of the content and the presence verification.

According to an advantage of the invention, proximity verification performed by proximity service 130 minimizes the number of unauthorized transactions allowed through point of service locations by enabling financial service providers to access an independent proximity service to determine whether to allow or decline a transaction based on the likelihood that the user at the point of service can realistically be physical located at the point of service in view of previously validated locations of the user at previous times as verified by IoT devices detecting the user's presence in environments proximate to the IoT devices. In the example, an advantage of the invention is that proximity service 130 uses location and time data reported from IoT devices, which may independently verify the presence of a user in a location based on content, such as voice or video data, the IoT device is already accessing within a physical environment proximate to the IoT device.

While in the embodiment in FIG. 1 proximity service 130 receives location data from IoT devices and from financial service providers, in another embodiment, proximity service 130 may also receive location and time information from user mobile devices reporting to proximity service 130 through a proximity interface integrated into the mobile devices or from another service or application running on the mobile devices that is directed to report location, time and presence verification data to proximity service 130.

In one example, while a particular financial service provider may provide a proprietary application for customers to download onto a mobile phone, for the customer mobile phone to then report a location to a financial service provider, the financial service provider bears the costs of managing a proprietary application. In contrast, according to an advantage of the present invention, a financial service provider may access proximity service 130, which collects location, time and presence verification information from IoT devices, and may also collect location, time and presence verification from mobile devices, without requiring the financial service provider to maintain proprietary applications for customers to download to customer mobile devices.

In one example, while a mobile device may be configured with a proximity interface to report to proximity service 130, the IoT devices that detect a user's presence throughout a day may be less susceptible to compromise than a user's mobile device. In particular, if a user's bag is stolen with the user's credit cards and the user's mobile device, then a location and time reported by the user's mobile device would represent the location of the unauthorized user, not an authorized user of an account identifier on a stolen credit card. In contrast, an IoT device that provides an assistant service installed in a user's home, office, or car is potentially less susceptible to being used by an unauthorized user, less likely to be physically removed and moved to a new location, and utilizes voice activation services which can be utilized for voice recognition to verify the presence of a user. In addition, in contrast, an IoT device that is configured in a smart home device, such as a smart security system, is more likely to remain in a fixed physical location, less likely to be physically removed and moved to a new location, and may already include a video camera and facial recognition services that can be used to verify the presence of a user.

While the embodiment in FIG. 1 is described with reference to financial service provider 140 and financial service provider 142 managing financial transactions, in another embodiment of the invention, one or more of financial service provider 140 and financial service provider may represent other types of transaction providers that are non-financial including, but not limited to a licensing service provider and an account service provider, where a user accesses a point of service to apply for a license and the licensing service provider automates the licensing process or a user accesses a point of service to open a new account and the account service provider automates the new account setup process.

In one example, mapping service 160 may represent a mapping service accessible to and shared across different types of services. Mapping service 160 may provide one or more interfaces through which different services may submit one or more types of queries for location feasibility assessment. In addition, in determining feasibility, mapping service 160 may track and consider actual travel conditions across different time periods to facilitate more accurate assessments of feasibility of travel during a particular time period.

In another embodiment, network 100 may include additional or alternate IoT devices, additional or alternate remote services, additional or alternate proximity interface services, additional or alternate proximity services, additional or alternate mapping services, additional or alternate financial service providers, and additional or alternate point of service device.

Figure 2:
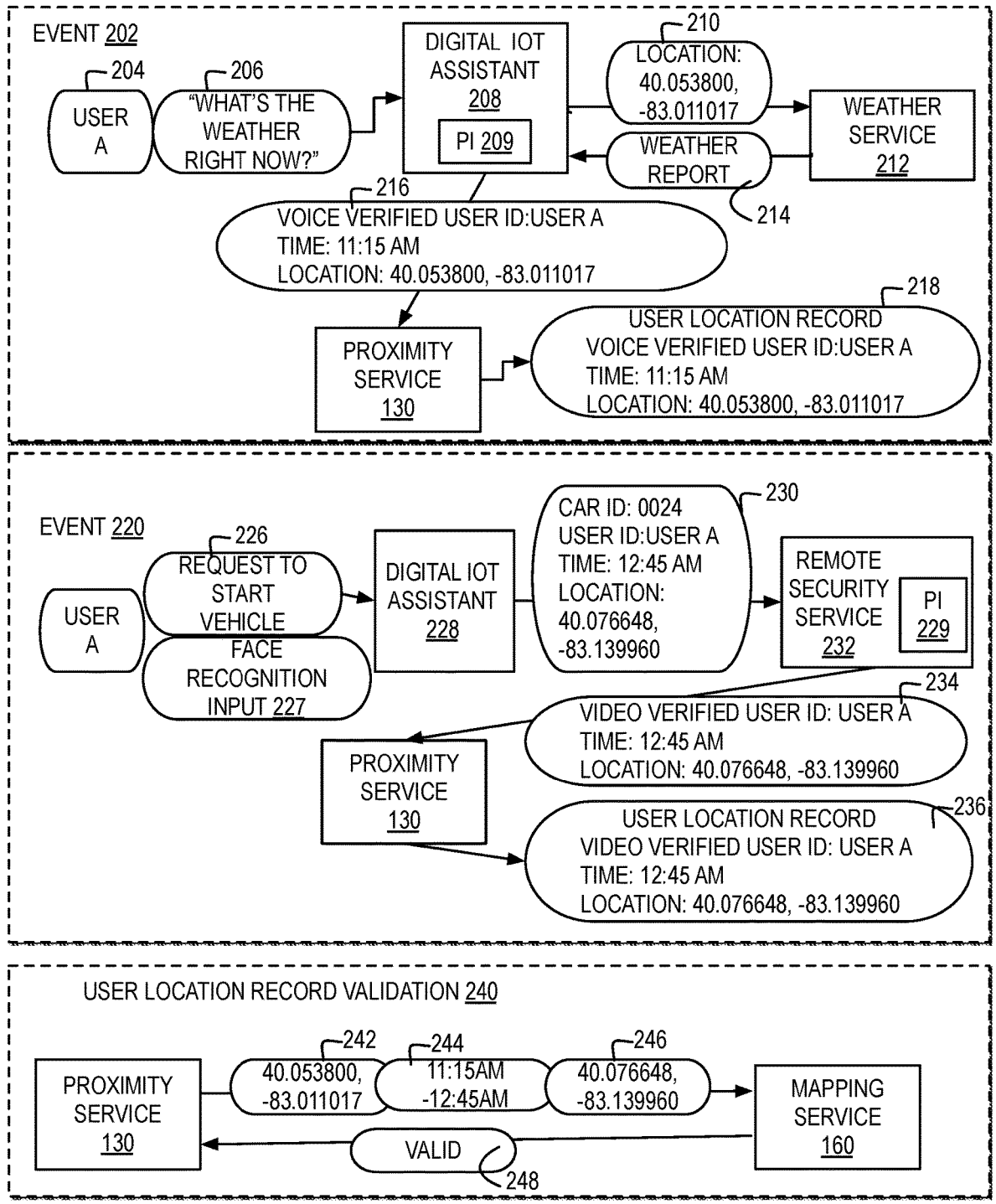
FIG. 2 is a block diagram illustrating one example of verification records sent by IoT device based proximity interfaces to a proximity service, which validates the verification records through a mapping service.

FIG. 2 illustrates a block diagram of examples of verification records sent by IoT device based proximity interfaces to a proximity service, which validates the verification records through a mapping service.

In the example, an event 202 indicates that a "user A", illustrated at reference numeral 204, provides a voice command of "what's the weather right now?" 206 to a digital IoT assistant 208. In one example, digital IoT assistant 208 may represent one or more types of IoT devices, such as device 110, device 112, and device 114, which perform as a digital assistant, performing tasks in response to voice commands. In the example, digital IoT assistant 208 converts the voice command of "what's the weather right now?" to text and triggers a task to a weather service 212 of a location 210 with a request for a weather forecast. Weather service 212 may respond with a weather report 214 to digital IoT assistant 208. Digital IoT assistant 208 may then convert a textual weather report 214 into audio and output the audio through an audio output interface or through another types of interface.

In the example, digital IoT assistant 208 includes a proximity interface (PI) 209. PI 209 detects the location event and automatically verifies the identity of the voice associated with voice command 206 against a sample for "user A". PI 209 sends a verification record 216 with the user identifier of "user A", a presence verification through voice verification, a time of "11:15 AM" and a location of "40.053800, −83.011017" to proximity service 130. Proximity service 130 initially stores verification record 216 without validation as a user location record 218.

In the example, an event 204 indicates that a "user A" performs an action of "request to start vehicle" 226 to a digital IoT assistant 228. In the example, digital IoT assistant 228 may require verification of the identity of the user requesting to start the vehicle through face recognition input 227. In one example, digital IoT assistant 228 may represent one or more types of IoT devices, such as device 110, device 112, and device 114, which is embedded in the vehicle and in response to different actions detected within the vehicle, such as a request to start the vehicle, manages IoT based services for the vehicle, such as location monitoring and security monitoring. In the example, digital IoT assistant 208, in response to receiving face recognition input 227 may locally perform facial recognition against one or more face samples for a particular user, to verify the identity of the user prior to allowing the vehicle to start. In another example, digital IoT assistant 208 may send face recognition input 227 to a remote service for performing facial recognition against user face samples stored by the remote service.

In the example, digital IoT assistant 228 also sends a report 230 of the action of "user A" starting a vehicle with a detected time and location to a remote security service 232 that continues to monitor the location of the vehicle when turned on and may provide additional security services, as requested. In the example, remote security service 232 represents an IoT service, such as remote service 116 and remote service 126, that performs a service for digital IoT assistant 228, and may perform services for other digital IoT assistants.

In addition, remote security service 232 includes PI 229. In the example, in response to detecting report 230 with a location identified, PI 229 sends a verification record 234 to proximity service 130 with the user identifier of "user A", time of "12:45 AM" and the location of "40.076648, −83.139960", as reported by digital IoT assistant 228 in report 230. In the example, proximity service 130 initially stores verification record 234 without validation as a user location record 236.

In the example, as illustrated at reference numeral 240, in response to receiving a second location record for "user A", proximity service 130 sends the location and time information in user location record 218 and user location record 236 to mapping service, as illustrated by location 242, location 246, and time difference 244. In the example, mapping service 160 determines that it is likely the user traveled from location 242 to location 246 within time difference 244 and returns a valid indicator 248. In the example, proximity service 130, in response to receiving valid indicator 248, may mark user location record 218 and user location record 236 as valid within user location records 138.

Figure 3:
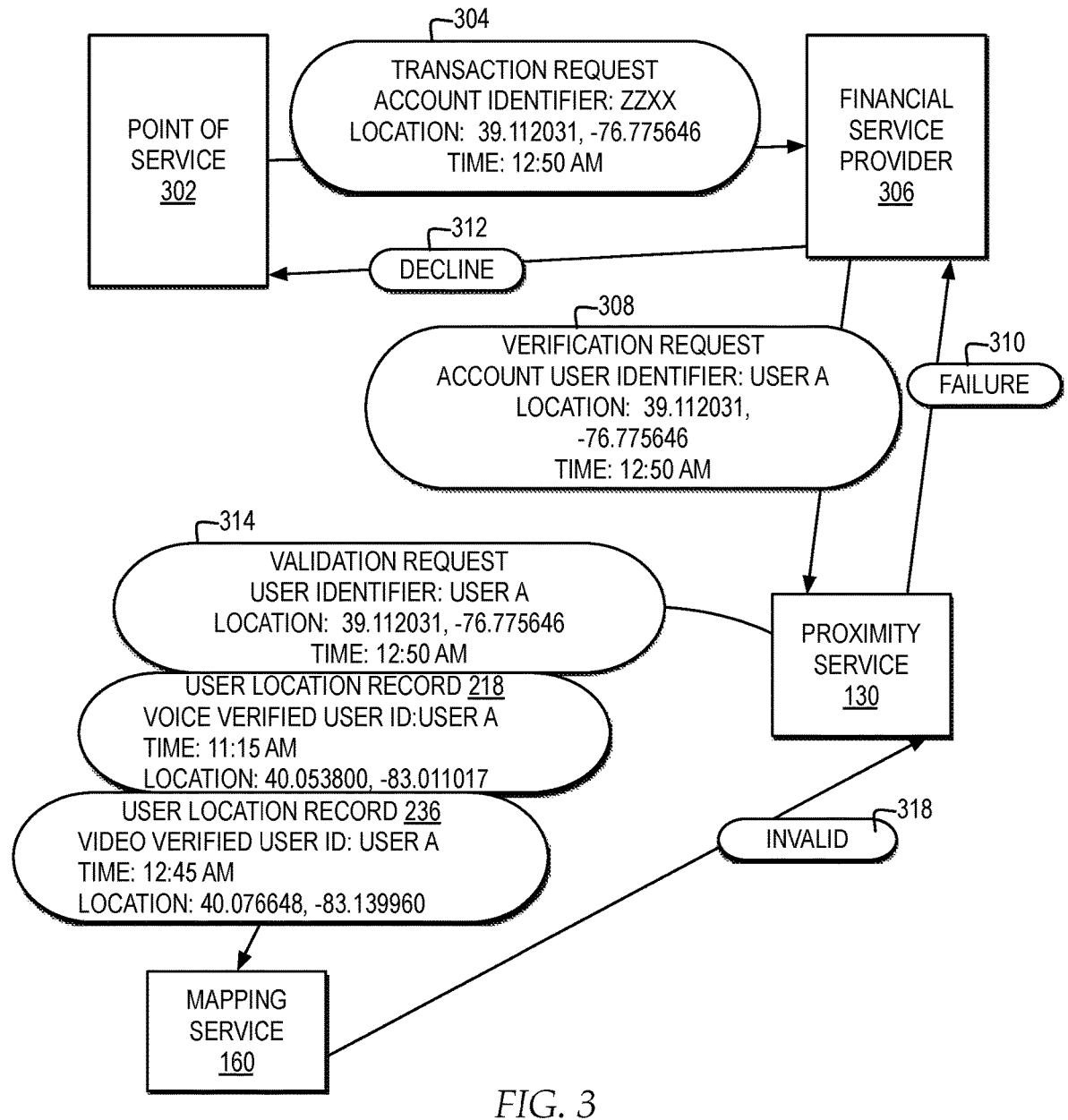
FIG. 3 is a block diagram illustrating one example of a proximity service managing a verification request from a financial service provider for IoT device based proximity verification of a user associated with an account identifier presented at a point of service managed by the financial service provider.

FIG. 3 illustrates a block diagram of one example of a proximity service managing a verification request from a financial service provider for IoT device based proximity verification of a user associated with an account identifier presented at a point of service managed by the financial service provider.

In the example, an individual presents an account identifier "ZZXX" at a point of service 302, such as point of service 150, point of service 152, and point of service 154. In the example, point of service 302 sends a transaction request 304 to a financial service provider 306 with account identifier "ZZXX", a location of point of service 302 of "39.112031, −76.775646", and a time of "12:50 AM". In the example, financial service provider 306 may represent one of financial service provider 140 and financial service provider 142.

In the example, financial service provider 306 receives transaction request 304, determines a user account identifier associated with account identifier "ZZXX", and selects to send a verification request 308 to proximity service 130 for account user identifier "user A" for the identified location and time. In the example, proximity service 130 receives verification request 308 and may initially determine a user identifier associated with account user identifier "user A". In one example, the user identifier and account user identifier may be the same identifier or may be different identifiers that are associated with each other by proximity service 130.

In the example, proximity service 130 identifies validated user location record 218 and user location record 236 associated with "user A" in user location records 138 and sends a validation request 314 with the user identifier and location and time of the transaction request from the point of service. In the example, mapping service 160 determines that the distance traveled to location of "39.112031, −76.775646" at a time of 12:50 AM, 5 minutes subsequent to the validated and verified IoT device reported presence of "user A" at location "40.076648, −83.139960" at 12:45 AM is not feasible and returns an invalid indicator 318 to proximity service 130. In the example, in response to proximity service 130 receiving invalid indicator 318, proximity service 130 sends a failure response 310 to financial service provider 306 and financial service provider 306 then declines the transaction and sends a decline indicator 312 to point of service 302.

Figure 4:
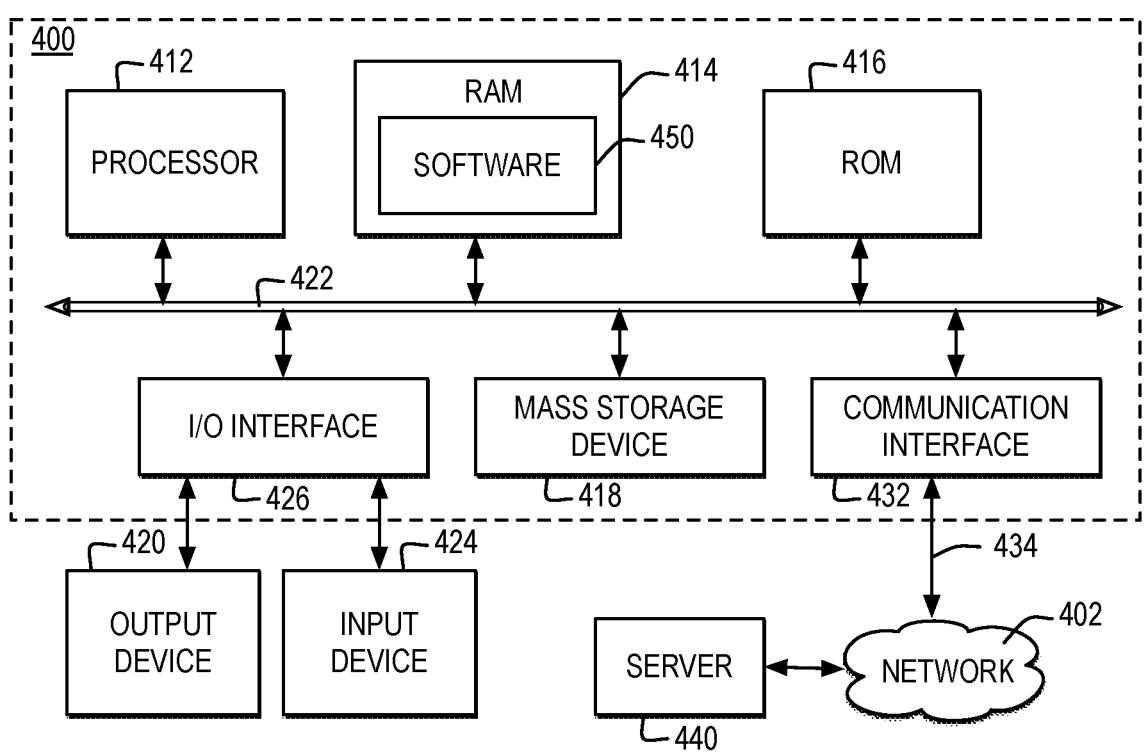
FIG. 4 is a block diagram illustrating one example of a computer system in which one embodiment of the invention may be implemented.

FIG. 4 illustrates a block diagram of one example of a computer system in which one embodiment of the invention may be implemented. The present invention may be performed in a variety of systems and combinations of systems, made up of functional components, such as the functional components described with reference to a computer system 400 and may be communicatively connected to a network, such as network 402.

Computer system 400 includes a bus 422 or other communication device for communicating information within computer system 400, and at least one hardware processing device, such as processor 412, coupled to bus 422 for processing information. Bus 422 preferably includes low-latency and higher latency paths that are connected by bridges and adapters and controlled within computer system 400 by multiple bus controllers. In one embodiment, when implemented as a server or node, computer system 400 includes multiple processors designed to improve network servicing power.

In one embodiment, processor 412 is at least one general-purpose processor that, during normal operation, processes data under the control of software 450, which includes at least one of application software, an operating system, middleware, and other code and computer executable programs accessible from a dynamic storage device such as random access memory (RAM) 414, a static storage device such as Read Only Memory (ROM) 416, a data storage device, such as mass storage device 418, or other data storage medium. In one embodiment, software 450 includes, but is not limited to, code, applications, protocols, interfaces, and processes for controlling one or more systems within a network including, but not limited to, an adapter, a switch, a server, a cluster system, and a grid environment.

In one embodiment, computer system 400 communicates with a remote computer, such as server 440, or a remote client. In one example, server 440 is connected to computer system 400 through any type of network, such as network 402, through a communication interface, such as network interface 432, or over a network link connected, for example, to network 402.

In one embodiment, multiple systems within a network environment are communicatively connected via network 402, which is the medium used to provide communications links between various devices and computer systems communicatively connected. Network 402 includes permanent connections such as wire or fiber optics cables and temporary connections made through telephone connections and wireless transmission connections, for example, and may include routers, switches, gateways and other hardware to enable a communication channel between the systems connected via network 402. Network 402 represents one or more of packet-switching based networks, telephony based networks, broadcast television networks, local area and wire area networks, public networks, and restricted networks.

Network 402 and the systems communicatively connected to computer 400 via network 402 implement one or more layers of one or more types of network protocol stacks which may include one or more of a physical layer, a link layer, a network layer, a transport layer, a presentation layer, and an application layer. For example, network 402 implements one or more of the Transmission Control Protocol/Internet Protocol (TCP/IP) protocol stack or an Open Systems Interconnection (OSI) protocol stack. In addition, for example, network 402 represents the worldwide collection of networks and gateways that use the TCP/IP suite of protocols to communicate with one another. Network 402 implements a secure HTTP protocol layer or other security protocol for securing communications between systems.

In the example, network interface 432 includes an adapter 434 for connecting computer system 400 to network 402 through a link and for communicatively connecting computer system 400 to server 440 or other computing systems via network 402. Although not depicted, network interface 432 may include additional software, such as device drivers, additional hardware and other controllers that enable communication. When implemented as a server, computer system 400 may include multiple communication interfaces accessible via multiple peripheral component interconnect (PCI) bus bridges connected to an input/output controller, for example. In this manner, computer system 400 allows connections to multiple clients via multiple separate ports and each port may also support multiple connections to multiple clients.

In one embodiment, the operations performed by processor 412 control the operations of flowchart of FIGS. 5-11 and other operations described herein. In one embodiment, operations performed by processor 412 are requested by software 450 or other code or the steps of one embodiment of the invention might be performed by specific hardware components that contain hardwired logic for performing the steps, or by any combination of programmed computer components and custom hardware components. In one embodiment, one or more components of computer system 400, or other components, which may be integrated into one or more components of computer system 400, contain hardwired logic for performing the operations of flowcharts in FIGS. 5-11.

In one embodiment, computer system 400 includes multiple peripheral components that facilitate input and output. These peripheral components are connected to multiple controllers, adapters, and expansion slots, such as input/output (I/O) interface 426, coupled to one of the multiple levels of bus 422. For example, input device 424 includes, for example, a microphone, a video capture device, an image scanning system, a keyboard, a mouse, or other input peripheral device, communicatively enabled on bus 422 via I/O interface 426 controlling inputs. In addition, for example, output device 420 communicatively enabled on bus 422 via I/O interface 426 for controlling outputs include, for example, one or more graphical display devices, audio speakers, and tactile detectable output interfaces, but in another example also includes other output interfaces. In alternate embodiments of the present invention, additional or alternate input and output peripheral components may be added.

With respect to FIG. 4, the one or more embodiments present invention including, but are not limited to, a system, a method, and/or a computer program product. In one embodiment, the computer program product includes a computer readable storage medium (or media) having computer readable program instructions thereon for causing a processor to carry out aspects of the present invention.

In one embodiment, the computer readable storage medium is a tangible device that can retain and store instructions for use by an instruction execution device. The computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. In one embodiment, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one embodiment, computer readable program instructions for carrying out operations of the present invention include one or more of assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one embodiment, the computer readable program instructions execute entirely on the user's computer, partly on the user's computer, as a stand-alone software package, partly on the user's computer and partly on a remote computer or entirely on the remote computer or server. In the latter scenario, in one example, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that in additional or alternate embodiments, the hardware depicted in FIG. 4 may vary. Furthermore, those of ordinary skill in the art will appreciate that the depicted example is not meant to imply architectural limitations with respect to the present invention.

Figure 5:
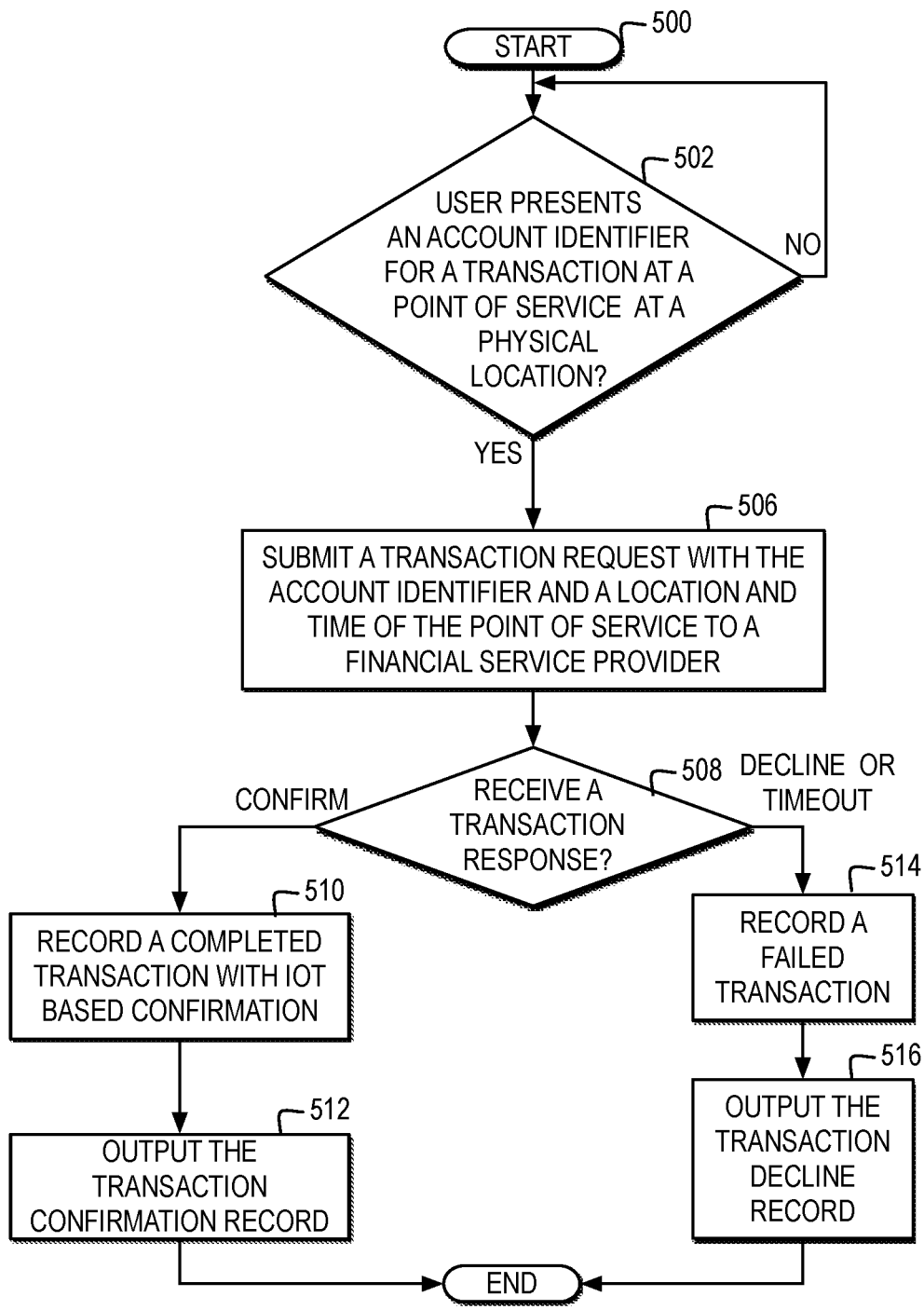
FIG. 5 is a high level logic flowchart illustrating a process and computer program for a point of service sending a transaction request to a financial service provider that accesses a proximity service for IoT based proximity verification that it is feasible for the user requesting the transaction at the point of service to be an authorized user.

FIG. 5 illustrates a high level logic flowchart of a process and computer program for a point of service sending a transaction request to a financial service provider that accesses a proximity service for IoT based proximity verification that it is feasible for the user requesting the transaction at the point of service to be an authorized user.

In one example, the process and program starts at block 500 and thereafter proceeds to block 502. Block 502 illustrates a determination whether a user presents an account identifier for a transaction at a point of service at a physical location. At block 502, if the user presents an account identifier for a transaction at a point of service at a physical location, then the process passes to block 504. Next, block 504 illustrates reading the account number expiration date and the account holder name from the account identifier. Thereafter, block 506 illustrates submitting a transaction request with the account number, expiration date, account holder name, and a location and time of the point of service to a financial service provider. Next, block 508 illustrates a determination whether a transaction response is received.

At block 508 if a confirm response is received then the process passes to block 510. Block 510 illustrates recording a completed transaction with IoT based confirmation. Next, block 512 illustrates outputting the transaction confirmation record, and the process ends.

If a decline response or timeout is received in the process passes the block 514. Block 514 illustrate recording a failed transaction. Next, block 516 illustrates outputting the transaction decline record, and the process ends.

Figure 6:
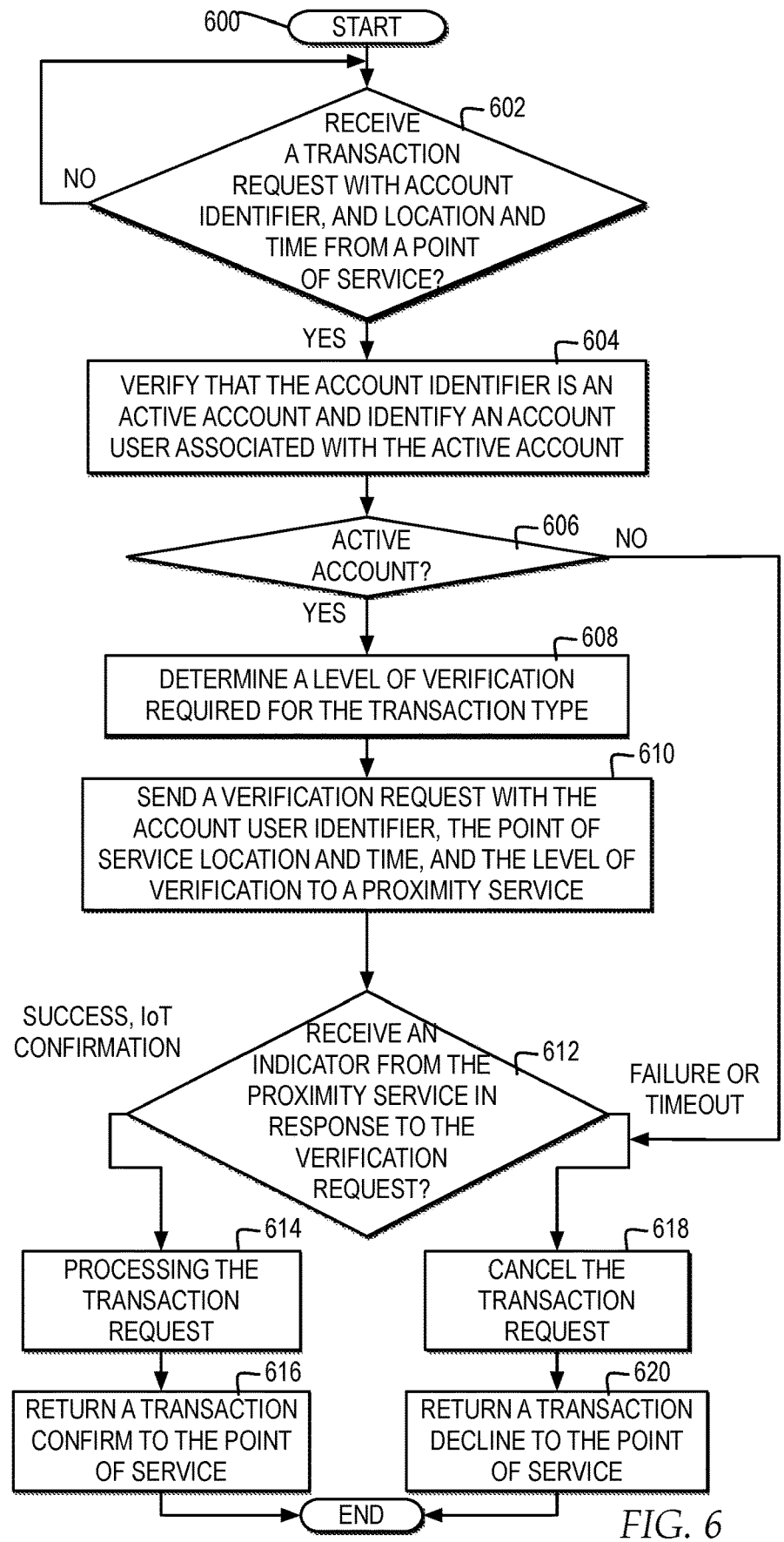
FIG. 6 is a high level logic flowchart illustrating a process and computer program for a financial service provider managing verification that an authorized user has submitted an account identifier at a point of service through a proximity service that performs IoT based proximity verification.

FIG. 6 illustrates a high level logic flowchart of a process and computer program for a financial service provider managing verification that an authorized user has submitted an account identifier at a point of service through a proximity service that performs IoT based proximity verification.

In one example, the process starts at block 600 and thereafter proceeds to block 602. Block 602 illustrates a determination whether a transaction request with account identifier and location and time are received from a point of service. At block 602 if a transaction request with account identifier and location and time are received from a point of service, then the process passes to block 604. Block 604 illustrates verifying that the account identifier is an active account and identify an account user associated with the active account. Next, block 606 illustrates a determination whether the account is active. At block 606 if the account is not active, then the process passes to blocks 618. Returning to block 606, if the account is active, then the process passes to block 608.

Block 608 illustrates determining a level of verification required for the transaction type. Next, block 610 illustrates sending a verification request with the account user identifier, the point of service location and time, and the level of verification to a proximity service. Thereafter, block 612 illustrates a determination whether an indicator is received from the proximity service in response to the verification request.

At block 612, if an indicator of success through IoT confirmation is received, then the process passes to block 614. Block 614 illustrates processing the transaction request. Next, block 616 illustrates returning a transaction confirmed to the point of service, and the process ends.

If an indicator of a failure or a timeout is received in the process passes to block 618. Block 618 illustrates canceling the transaction request. Next, block 620 illustrates returning a transaction decline to the point of service, in the process ends.

Figure 7:
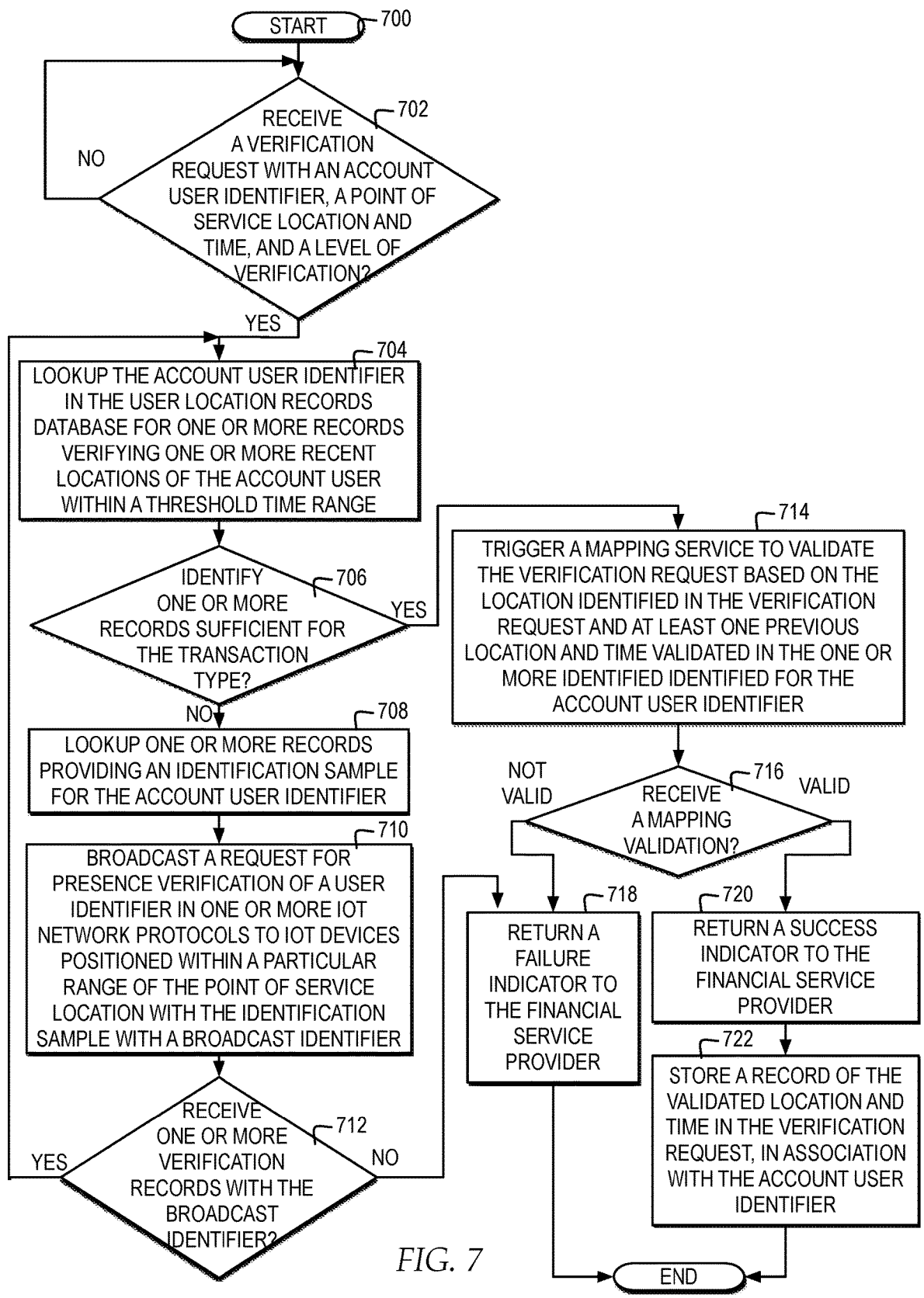
FIG. 7 is a high level logic flowchart illustrating a process and computer program for a proximity service, in response to a verification request from a financial service provider, managing verification that an authorized user has submitted an account identifier at a point of service through IoT based proximity verification.

FIG. 7 illustrates a high level logic flowchart of a process and computer program for a proximity service, in response to a verification request from a financial service provider, managing verification that an authorized user has submitted an account identifier at a point of service through IoT based proximity verification.

In one example, the process starts at block 700 and thereafter proceeds to block 702. Block 702 illustrates a determination whether a verification request is received with an account user identifier, a point of service location and time, and a level of verification. At block 702, if a verification request is received with an account user identifier, a point of service location and time, and a level of verification, then the process passes to block 704.

Block 704 illustrates looking up the account user identifier in the user location records database for one or more records verifying one or more recent locations of the account user, with in a threshold time range. Next, block 706 illustrates a determination whether one or more records are identified that are sufficient for the transaction type. In one example, the level of verification may specify one or more of a threshold time range and a type of verification required, such as requiring location feasibility verification in combination with facial recognition or voice recognition.

At block 706, if one or more records are not identified that are sufficient for the transaction type, then the process passes to block 708. Block 708 illustrates looking up one or more records providing an identification sample for the account user identifier. Next, block 710 illustrates broadcasting a request for presence verification of a user identifier in one or more IoT network protocols to IoT devices positioned within a particular range of the point of service location with the identification sample, with a broadcast identifier. Thereafter, block 712 illustrates a determination whether one or more verification records with the broadcast identifier are received. At block 712, if one or more verification records with the broadcast identifier are received, then the process returns to block 704. Otherwise, at block 712, if no response to the broadcast is received, then the process passes to block 718. Block 718 illustrates returning a failure indicator to the financial service provider, and the process ends.

Returning to block 706, at block 706, if one or more records are identified that are sufficient for the transaction type, then the process passes to block 714. Block 714 illustrates triggering a mapping service to validate the verification request based on the location identified in the verification request and at least one previous location and time validated in the one or more records identified for the account user identifier. Next, block 716 illustrates a determination whether a mapping response is received.

At block 716 if a mapping response of not valid is received, then the process passes to block 718. Block 718 illustrates returning a failure indicator to the financial service provider, and the process ends.

At block 716, if a mapping response of valid is received, then the process passes to blocks 720. Block 720 illustrates returning a success indicator to the financial service provider. Next, block 722 illustrates storing a record of the validated location and time in the verification request, in association with the account user identifier, and the process ends.

Figure 8:
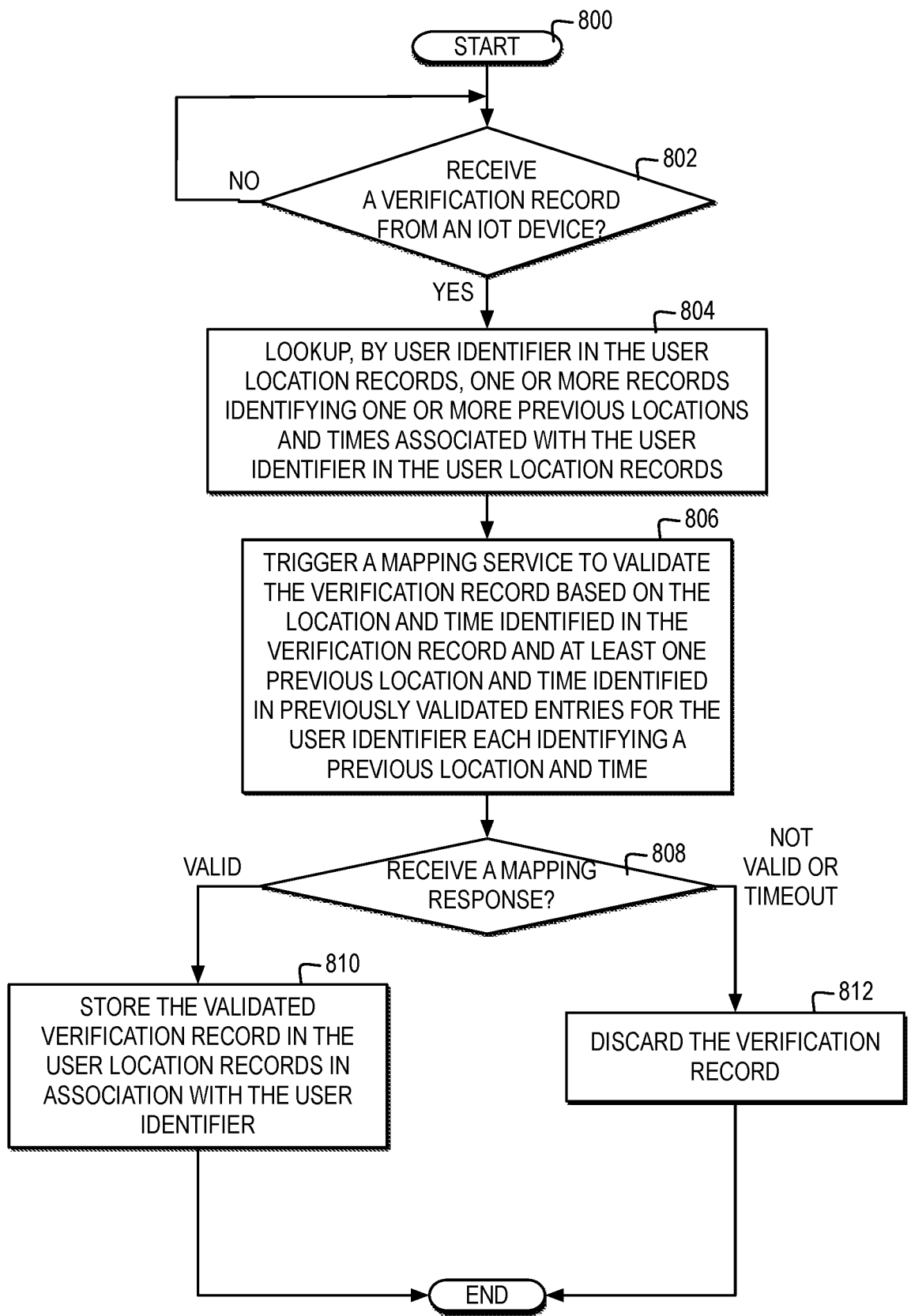
FIG. 8 is a high level logic flowchart illustrating a process and computer program for a proximity service managing validation of verification records of user locations submitted from IoT devices to provide IoT based proximity verification.

FIG. 8 illustrates a high level logic flowchart of a process and computer program for a proximity service managing validation of verification records of user locations submitted from IoT devices to provide IoT based proximity verification.

In one example, the process starts at block 800 and thereafter proceeds to block 802. Block 802 illustrates a determination whether a verification record is received from an IoT device. At block 802, if a verification record is received from an IoT device, then the process passes to block 804. Block 804 illustrates looking up, buy user identifier in the user location records, one or more records identifying one or more previous locations and times associated with the user identifier in the user location records. Next, Block 806 illustrates triggering a mapping service to validate the verification record based on the location and time identified in the verification record and at least one previous location and time identified and previously validated entries for the user identifier, each identifying a previous location and time. Thereafter, block 808 illustrates a determination of a type of mapping response received.

At block 808, if a mapping response of valid is received, then the process passes the block 810. Block 810 illustrates storing the validated verification record in the user location records in association with a user identifier, and the process ends.

At block 808, if a mapping response of not valid or a timeout is received, then the process passes the block 812. Block 812 illustrates discarding the verification recording, and the process ends. Alternatively, the verification record may be stored in the user location records in association with the user identifier, but marked as not validated.

Figure 9:
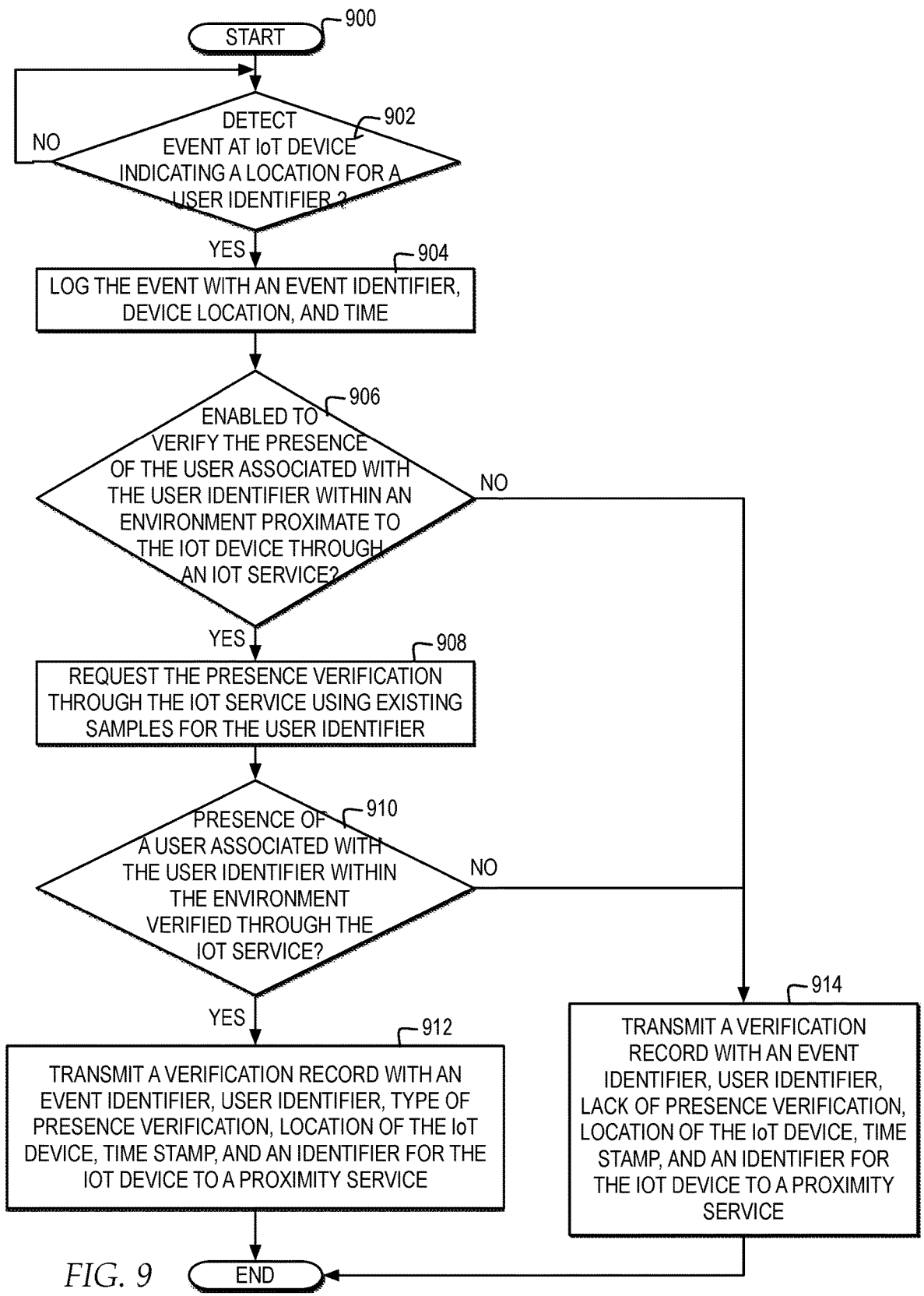
FIG. 9 is a high level logic flowchart illustrating a process and computer program for a proximity interface of an IoT device transmitting a verification of a presence of a user to a proximity service that provides IoT based proximity verification.

FIG. 9 illustrates a high level logic flowchart of a process and computer program for a proximity interface of an IoT device transmitting a verification of a presence of a user to a proximity service that provides IoT based proximity verification.

In one example, the process starts at block 900 and thereafter proceeds to block 902. Block 902 illustrate a determination whether an event at an IoT device indicating a location for a user identifier is detected. At block 902, if an event at an IoT device indicating a location for a user identifier is detected, then the process passes to block 904. Block 904 illustrates logging the event with the event identifier, device location, and time, and the process passes to block 906. Block 906 illustrates a determination whether the presence of the user associated with the user identifier is enabled to be verified within a physical environment proximate to the IoT device through an IoT service.

At block 906, if the presence of the user associated with the user identifier is not enabled to be verified within a physical environment proximate to the IoT device through an IoT service, then the process passes to block 914. Block 914 illustrates transmitting a verification record with an event identifier, user identifier, lack of presence verification, location of the IoT device, time stamp, and an identifier for the IoT device, to the proximity service, and the process ends At block 906, if the presence of the user associated with the user identifier is enabled to be verified within a physical environment proximate to the IoT device through an IoT service, then the process passes to block 908. Block 908 illustrates requesting a presence verification through the IoT service using existing samples for the user identifier. Next, block 910 illustrates a determination whether the presence of a user associated with the user identifier within the environment is verified through the IoT service. At block 910, if the presence of a user associated with the user identifier within the environment is verified through the IoT service, then the process passes to block 912. Block 912 illustrates transmitting a verification record with an event identifier, user identifier, type of presence verification, location of the IoT device, time stamp, and an identifier for the IoT device, to the proximity service, and the process ends. Returning to block 910, if the presence of a user associated with the user identifier within the environment is not verified through the IoT service, then the process passes to block 914, and proceeds as previously described.

Figure 10:
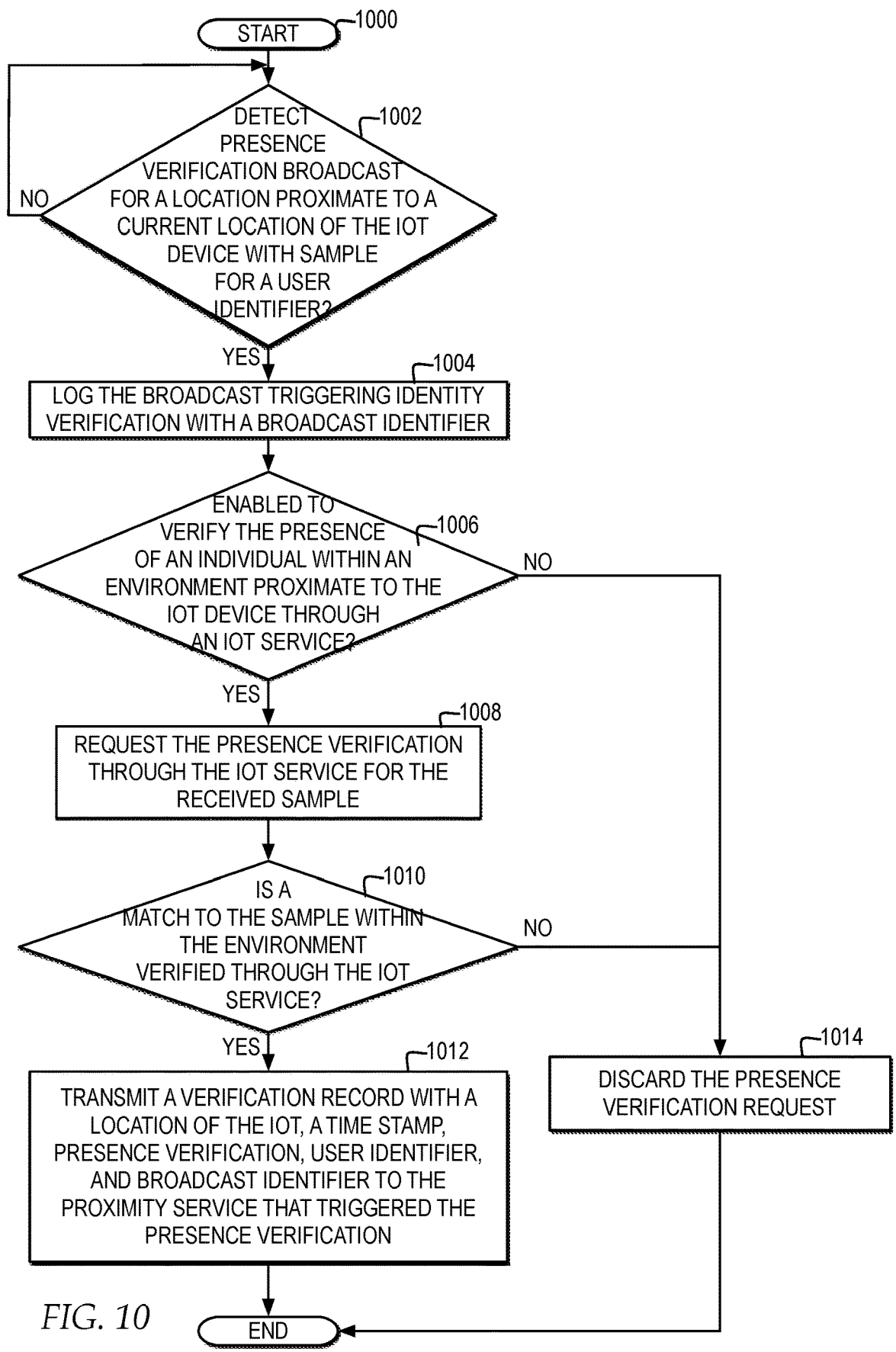
FIG. 10 is a high level logic flowchart illustrating a process and computer program for a proximity interface of an IoT device responding to a broadcast request from a proximity service requesting presence verification of a user, where the proximity service provides IoT based proximity verification.

FIG. 10 illustrates a high level logic flowchart of a process and computer program for a proximity interface of an IoT device responding to a broadcast request from a proximity service requesting presence verification of a user, where the proximity service provides IoT based proximity verification.

In one example, the process starts at block 1000 and thereafter proceeds to block 1002. Block 1002 illustrates a determination whether a presence verification broadcast for a location proximate to a current location of the IoT device is detected. At block 1002, if a presence verification broadcast for a location proximate to a current location of the IoT device is detected, then the process passes to block 1004. Block 1004 illustrates logging the broadcast triggering identity verification with a broadcast identifier. Next, block 1006 illustrates a determination whether the presence of an individual with an environment proximate to the IoT device is enabled to be verified through an IoT service.

At block 1006, if the presence of an individual with an environment proximate to the IoT device is not enabled to be verified through an IoT service, then the process passes to block 1014. Block 1014 illustrates discarding the presence verification request, and the process ends.

At block 1006, if the presence of an individual with an environment proximate to the IoT device is enabled to be verified through an IoT service, then the process passes to block 1008. Block 1008 illustrates requesting the presents verification through the IoT service for the received sample. Next, block 1010 illustrates a determination whether a match to the sample within the environment proximate to the IoT device is verified through the IoT service. At block 1010, if a match to the sample within the environment proximate to the IoT device is not verified through the IoT service, then the process passes to block 1014, and proceeds as previously described. At block 1010, if a match to the sample within the environment proximate to the IoT device is verified through the IoT service, then the process passes to block 1012. Block 1012 illustrates transmitting a verification record with a location of the IoT, a timestamp, a presence verification, a user identifier, and the broadcast identifier to the proximity service that triggered the presence verification, and the process ends.

Figure 11:
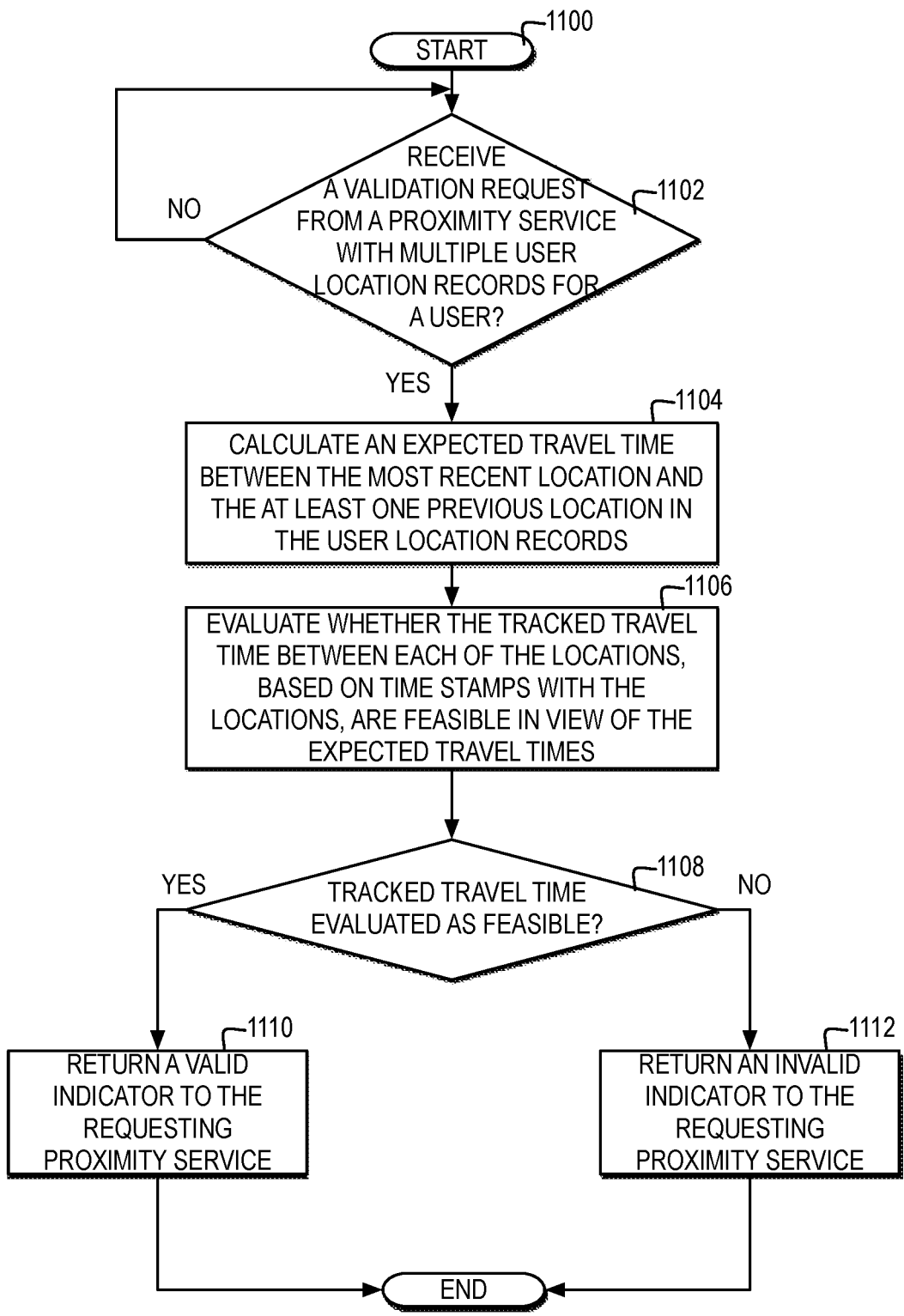
FIG. 11 is a high level logic flowchart illustrating a process and computer program for a mapping service managing a determination of whether a currently reported location of a user is feasible based on previously reported locations of the user by IoT devices to a proximity service.

FIG. 11 illustrates a high level logic flowchart of a process and computer program for a mapping service managing a determination of whether a currently reported location of a user is feasible based on previously reported locations of the user by IoT devices to a proximity service.

In one example, the process starts at block 1100 and proceeds to block 1102. Block 1102 illustrates a determination whether a validation request from a proximity service with multiple user location records for a user is received. At block 1102, if a validation request from a proximity service with multiple user location records for a user is received, then the process passes to block 1104. Block 1104 illustrates calculating an expected travel time between the most recent location and at least one previous location in the user location records. Thereafter, block 1106 illustrates evaluating whether the tracked travel time between each of the locations based on the timestamps with the locations are feasible in view of the expected travel times, and the process passes to block 1108.

Block 1108 illustrates a determination whether the tracked travel time is evaluated as feasible. At block 1108, if the tracked travel time is evaluated as feasible, then the process passes to block 1110. Block 1110 illustrates returning a valid indicator to the requesting proximity service, and the process ends. Returning to block 1108, at block 1108, if the tracked travel time is evaluated as not feasible, then the process passes to block 1112. Block 1112 illustrates returning an invalid indicator to the requesting proximity service, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

The foregoing description is just an example of embodiments of the invention, and variations and substitutions. While the invention has been particularly shown and described with reference to one or more embodiments, it will be understood by those skilled in the art that various changes in form and detail may be made therein without departing from the spirit and scope of the invention.

What is claimed is:

1. A method comprising:
   responsive to receiving a second verification record of a second location and a second time at which a user is verified as present at the second location by a second internet of things (IoT) device based on biometric input recognition performed by a second IoT service to the second IoT device, maintaining, by a computer system, the second verification record in a user location database in association with a user identifier for the user only if travel between the second location and a first location previously recorded at a first time prior to the second time is feasible as determined by a mapping service, the second IoT device for performing another service using a biometric input separate from generating and transmitting the verification record based on the biometric input; and
   responsive to receiving a verification request for verifying feasibility of the proximity of an authorized user of an account identifier at a third location of a point of service at which the account identifier is presented at a third time with a transaction request and detecting the second verification record is maintained, verifying, by the computer system, the feasibility of the proximity of the authorized user as present at the third location in view of the second location and second time reported by the second IoT device in the second verification record.

2. The method according to claim 1, further comprising:
   receiving, by the computer system, a first verification record of the first location, the first time, and a verified user identifier for the user from a first IoT device, wherein the verified user identifier indicates a type of biometric input recognition performed by a first IoT service to the first IoT device to verify presence of the user within a first environment captured proximate to the first IoT device, the first IoT device for performing a first service using a first biometric input separate from generating and transmitting the first verification based on the first biometric input; and
   storing, by the computer system, the first verification record in the user location database in association with the user identifier.

3. The method according to claim 1, further comprising:
   receiving, by the computer system, the verification request from a financial service provider providing transaction management to the point of service for the transaction request, the financial service provider comprising one of a plurality of financial service providers sending a plurality of verification requests to a proximity service;
   responsive to verifying the feasibility of the proximity of the authorized user as present at the third location, sending, by the proximity service, a success indicator to the financial service provider, wherein in response to receiving the success indicator, the financial service provider processes the transaction request; and
   responsive to verifying the feasibility of the proximity of the authorized user as present at the third location, sending, by the proximity service, a success indicator to the financial service provider, wherein in response to receiving the success indicator, the financial service provider processes the transaction request.

4. The method according to claim 1, wherein responsive to receiving a second verification record of a second location and a second time at which a user is verified as present at the second location by a second IoT device based on biometric input recognition performed by a second IoT service to the second IoT device, maintaining, by a computer system, the second verification record in a user location database in association with a user identifier for the user only if travel between the second location and a first location previously recorded at a first time prior to the second time is feasible as determined by a mapping service, the second IoT device for performing another service using a biometric input separate from generating and transmitting the second verification record based on the biometric input further comprises:
 receiving, by the computer system, the second verification record of the second location and the second time at which the user is verified as present at the second location by the second IoT device based on biometric input recognition comprising voice recognition performed by the second IoT service to the second IoT device, the second IoT service performing the another service using the biometric input of a voice command by converting the voice command to text and performing a task specified in converted text.

5. The method according to claim 1, wherein responsive to receiving a second verification record of a second location and a second time at which a user is verified as present at the second location by a second IoT device based on biometric input recognition performed by a second IoT service to the second IoT device, maintaining, by a computer system, the second verification record in a user location database in association with a user identifier for the user only if travel between the second location and a first location previously recorded at a first time prior to the second time is feasible as determined by a mapping service, the second IoT device for performing another service using a biometric input separate from generating and transmitting the second verification record based on the biometric input further comprises:
 receiving, by the computer system, the second verification record of the second location and the second time at which the user is verified as present at the second location by the second IoT device based on biometric input recognition comprising facial recognition performed by the second IoT service to the second IoT device, the second IoT service performing the another service using the biometric input of captured video of a face by confirming the face matches an authorized user face sample as part of a security service provided by the second IoT service.

6. The method according to claim 1, further comprising:
 responsive to receiving the verification request for verifying feasibility of the proximity of the authorized user of the account identifier at the third location of the point of service at which the account identifier is presented at the third time with the transaction request and detecting the record is not maintained, broadcasting, by the computer system, a presence verification request to a plurality of IoT devices with a biometric sample, wherein the presence verification request asks each of the plurality of IoT devices whether a presence of the user matching the biometric sample is available within a separate environment captured by each of the plurality of IoT devices;
 responsive to receiving at least one additional verification record from at least one of the plurality of IoT devices in response to the broadcast presence verification request, maintaining, by the computer system, each at least one additional verification record in the user location database in association with the user identifier only if travel between at least one additional location in the at least one additional verification record and the first location previously recorded at the first time prior to at least one additional time in the at least one additional verification record is feasible as determined by the mapping service; and
 responsive to maintaining the at least one additional verification record, verifying, by the computer system, the feasibility of the proximity of the authorized user as present at the third location in view of the at least one additional location and the at least one additional time reported by the at least one IoT device in the at least one additional verification record.

7. The method according to claim 1, wherein responsive to receiving a second verification record of a second location and a second time at which a user is verified as present at the second location by a second IoT device based on biometric input recognition performed by a second IoT service to the second IoT device, maintaining, by a computer system, the second verification record in a user location database in association with a user identifier for the user only if travel between the second location and a first location previously recorded at a first time prior to the second time is feasible as determined by a mapping service, the second IoT device for performing another service using a biometric input separate from generating and transmitting the verification record based on the biometric input further comprises:
 receiving, by the computer system, the second verification record from a proximity interface integrated in at least one of the second IoT device and the second IoT service, the second IoT device comprising an IoT interface to support communications by the IoT device in an IoT protocol on a network, the proximity interface triggering at least one of the second IoT device and the second IoT service to perform the biometric input recognition in response to detecting an event at the IoT device comprising capture of biometric input.

8. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
 program instructions to, responsive to receiving a second verification record of a second location and a second time at which a user is verified as present at the second location by a second internet of things (IoT) device based on biometric input recognition performed by a second IoT service to the second IoT device, maintain the second verification record in a user location database in association with a user identifier for the user only if travel between the second location and a first location previously recorded at a first time prior to the second time is feasible as determined by a mapping service, the second IoT device for performing another service using a biometric input separate from generating and transmitting the verification record based on the biometric input; and
 program instructions to, responsive to receiving a verification request for verifying feasibility of the proximity of an authorized user of an account identifier at a third location of a point of service at which the account identifier is presented at a third time with a transaction request and detecting the second verification record is maintained, verify the feasibility of the proximity of the authorized user as present at the third location in view of the second location and second time reported by the second IoT device in the second verification record.

9. The computer system according to claim 8, the program instructions further comprising:
program instructions to receive a first verification record of the first location, the first time, and a verified user identifier for the user from a first IoT device, wherein the verified user identifier indicates a type of biometric input recognition performed by a first IoT service to the first IoT device to verify presence of the user within a first environment captured proximate to the first IoT device, the first IoT device for performing a first service using a first biometric input separate from generating and transmitting the first verification based on the first biometric input; and
program instructions to store the first verification record in the user location database in association with the user identifier.

10. The computer system according to claim 8, the program instructions further comprising:
program instructions to receive the verification request from a financial service provider providing transaction management to the point of service for the transaction request, the financial service provider comprising one of a plurality of financial service providers sending a plurality of verification requests to a proximity service;
program instructions to, responsive to verifying the feasibility of the proximity of the authorized user as present at the third location, send, by the proximity service, a success indicator to the financial service provider, wherein in response to receiving the success indicator, the financial service provider processes the transaction request; and
program instructions to, responsive to verifying the feasibility of the proximity of the authorized user as present at the third location, send, by the proximity service, a success indicator to the financial service provider, wherein in response to receiving the success indicator, the financial service provider processes the transaction request.

11. The computer system according to claim 8, wherein the program instructions to, responsive to receiving a second verification record of a second location and a second time at which a user is verified as present at the second location by a second IoT device based on biometric input recognition performed by a second IoT service to the second IoT device, maintain the second verification record in a user location database in association with a user identifier for the user only if travel between the second location and a first location previously recorded at a first time prior to the second time is feasible as determined by a mapping service, the second IoT device for performing another service using a biometric input separate from generating and transmitting the second verification record based on the biometric input further comprise:
program instructions to receive the second verification record of the second location and the second time at which the user is verified as present at the second location by the second IoT device based on biometric input recognition comprising voice recognition performed by the second IoT service to the second IoT device, the second IoT service performing the another service using the biometric input of a voice command by converting the voice command to text and performing a task specified in converted text.

12. The computer system according to claim 8, wherein the program instructions to, responsive to receiving a second verification record of a second location and a second time at which a user is verified as present at the second location by a second IoT device based on biometric input recognition performed by a second IoT service to the second IoT device, maintain the second verification record in a user location database in association with a user identifier for the user only if travel between the second location and a first location previously recorded at a first time prior to the second time is feasible as determined by a mapping service, the second IoT device for performing another service using a biometric input separate from generating and transmitting the second verification record based on the biometric input further comprise:
receiving, by the computer system, the second verification record of the second location and the second time at which the user is verified as present at the second location by the second IoT device based on biometric input recognition comprising facial recognition performed by the second IoT service to the second IoT device, the second IoT service performing the another service using the biometric input of captured video of a face by confirming the face matches an authorized user face sample as part of a security service provided by the second IoT service.

13. The computer system according to claim 8, the program instructions further comprising:
program instructions to, responsive to receiving the verification request for verifying feasibility of the proximity of the authorized user of the account identifier at the third location of the point of service at which the account identifier is presented at the third time with the transaction request and detecting the record is not maintained, broadcast a presence verification request to a plurality of IoT devices with a biometric sample, wherein the presence verification request asks each of the plurality of IoT devices whether a presence of the user matching the biometric sample is available within a separate environment captured by each of the plurality of IoT devices;
program instructions to, responsive to receiving at least one additional verification record from at least one of the plurality of IoT devices in response to the broadcast presence verification request, maintain each at least one additional verification record in the user location database in association with the user identifier only if travel between at least one additional location in the at least one additional verification record and the first location previously recorded at the first time prior to at least one additional time in the at least one additional verification record is feasible as determined by the mapping service; and
program instructions to, responsive to maintaining the at least one additional verification record, verify the feasibility of the proximity of the authorized user as present at the third location in view of the at least one additional location and the at least one additional time reported by the at least one IoT device in the at least one additional verification record.

14. The program instructions according to claim 8, wherein program instructions to, responsive to receiving a second verification record of a second location and a second time at which a user is verified as present at the second location by a second IoT device based on biometric input recognition performed by a second IoT service to the second IoT device, maintain the second verification record in a user location database in association with a user identifier for the user only if travel between the second location and a first location previously recorded at a first time prior to the second time is feasible as determined by a mapping service, the second IoT device for performing another service using a biometric input separate from generating and transmitting the verification record based on the biometric input further comprise:

program instructions to receive the second verification record from a proximity interface integrated in at least one of the second IoT device and the second IoT service, the second IoT device comprising an IoT interface to support communications by the IoT device in an IoT protocol on a network, the proximity interface triggering at least one of the second IoT device and the second IoT service to perform the biometric input recognition in response to detecting an event at the IoT device comprising capture of biometric input.

15. A computer program product comprises a computer readable storage medium having program instructions embodied therewith, wherein the computer readable storage medium is not a transitory signal per se, the program instructions executable by a computer to cause the computer to:

responsive to receiving a second verification record of a second location and a second time at which a user is verified as present at the second location by a second internet of things (IoT) device based on biometric input recognition performed by a second IoT service to the second IoT device, maintain, by a computer, the second verification record in a user location database in association with a user identifier for the user only if travel between the second location and a first location previously recorded at a first time prior to the second time is feasible as determined by a mapping service, the second IoT device for performing another service using a biometric input separate from generating and transmitting the verification record based on the biometric input; and responsive to receiving a verification request for verifying feasibility of the proximity of an authorized user of an account identifier at a third location of a point of service at which the account identifier is presented at a third time with a transaction request and detecting the second verification record is maintained, verify, by the computer, the feasibility of the proximity of the authorized user as present at the third location in view of the second location and second time reported by the second IoT device in the second verification record.

16. The computer program product according to claim 15, further comprising the program instructions executable by a computer to cause the computer to:

receive, by the computer, a first verification record of the first location, the first time, and a verified user identifier for the user from a first IoT device, wherein the verified user identifier indicates a type of biometric input recognition performed by a first IoT service to the first IoT device to verify presence of the user within a first environment captured proximate to the first IoT device, the first IoT device for performing a first service using a first biometric input separate from generating and transmitting the first verification based on the first biometric input; and store, by the computer, the first verification record in the user location database in association with the user identifier.

17. The computer program product according to claim 15, further comprising the program instructions executable by a computer to cause the computer to:

receive, by the computer, the verification request from a financial service provider providing transaction management to the point of service for the transaction request, the financial service provider comprising one of a plurality of financial service providers sending a plurality of verification requests to a proximity service;

responsive to verifying the feasibility of the proximity of the authorized user as present at the third location, send, by the computer, by the proximity service, a success indicator to the financial service provider, wherein in response to receiving the success indicator, the financial service provider processes the transaction request; and responsive to verifying the feasibility of the proximity of the authorized user as present at the third location, send, by the computer, by the proximity service, a success indicator to the financial service provider, wherein in response to receiving the success indicator, the financial service provider processes the transaction request.

18. The computer program product according to claim 15, further comprising the program instructions executable by a computer to cause the computer to:

receive, by the computer, the second verification record of the second location and the second time at which the user is verified as present at the second location by the second IoT device based on biometric input recognition comprising voice recognition performed by the second IoT service to the second IoT device, the second IoT service performing the another service using the biometric input of a voice command by converting the voice command to text and performing a task specified in converted text.

19. The computer program product according to claim 15, further comprising the program instructions executable by a computer to cause the computer to:

receive, by the computer, the second verification record of the second location and the second time at which the user is verified as present at the second location by the second IoT device based on biometric input recognition comprising facial recognition performed by the second IoT service to the second IoT device, the second IoT service performing the another service using the biometric input of captured video of a face by confirming the face matches an authorized user face sample as part of a security service provided by the second IoT service.

20. The computer program product according to claim 15, further comprising the program instructions executable by a computer to cause the computer to:

responsive to receiving the verification request for verifying feasibility of the proximity of the authorized user of the account identifier at the third location of the point of service at which the account identifier is presented at the third time with the transaction request and detecting the record is not maintained, broadcast, by the computer, a presence verification request to a plurality of IoT devices with a biometric sample, wherein the presence verification request asks each of the plurality of IoT devices whether a presence of the user matching the biometric sample is available within a separate environment captured by each of the plurality of IoT devices;

responsive to receiving at least one additional verification record from at least one of the plurality of IoT devices in response to the broadcast presence verification request, maintain, by the computer, each at least one additional verification record in the user location database in association with the user identifier only if travel between at least one additional location in the at least one additional verification record and the first location previously recorded at the first time prior to at least one additional time in the at least one additional verification record is feasible as determined by the mapping service; and responsive to maintaining the at least one additional verification record, verify, by the computer, the feasibility of the proximity of the authorized user as present at the third location in view of the at least one additional location and the at least one additional time reported by the at least one IoT device in the at least one additional verification record.

* * * * *